July 28, 1964 C. D. DOSKER 3,142,600
METHOD OF MAKING A PLASTIC-COATED BOWLING PIN
Filed April 13, 1959 2 Sheets-Sheet 2
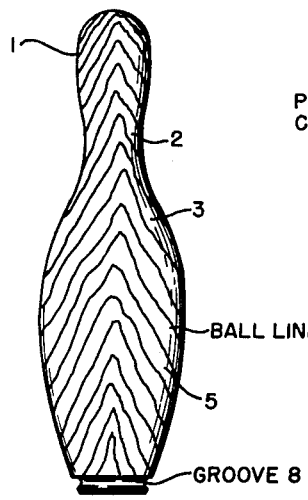
FIG. 3
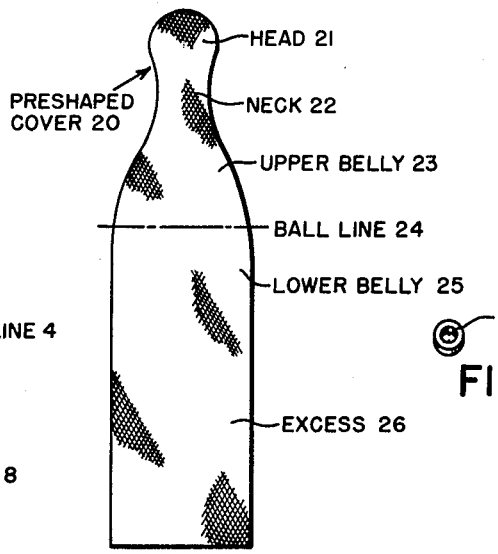
FIG. 4
FIG. 5
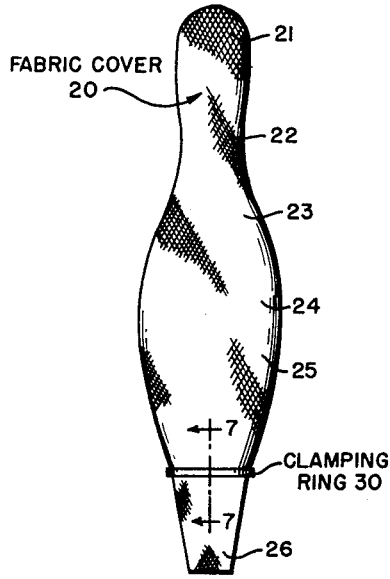
FIG. 6
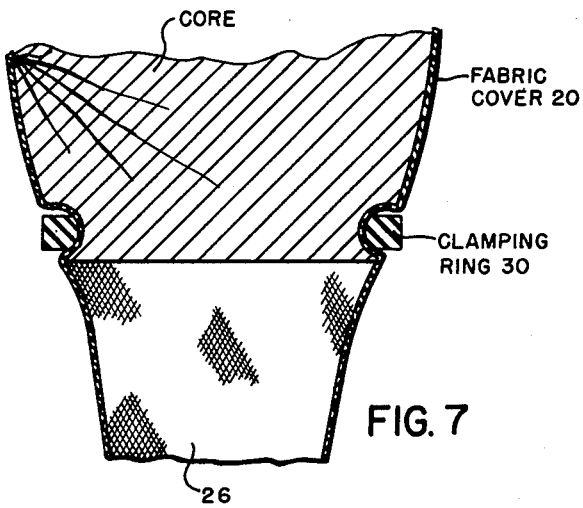
FIG. 7
INVENTOR
CORNELIUS D. DOSKER
BY　*Arthur J. Robert*
ATTORNEY

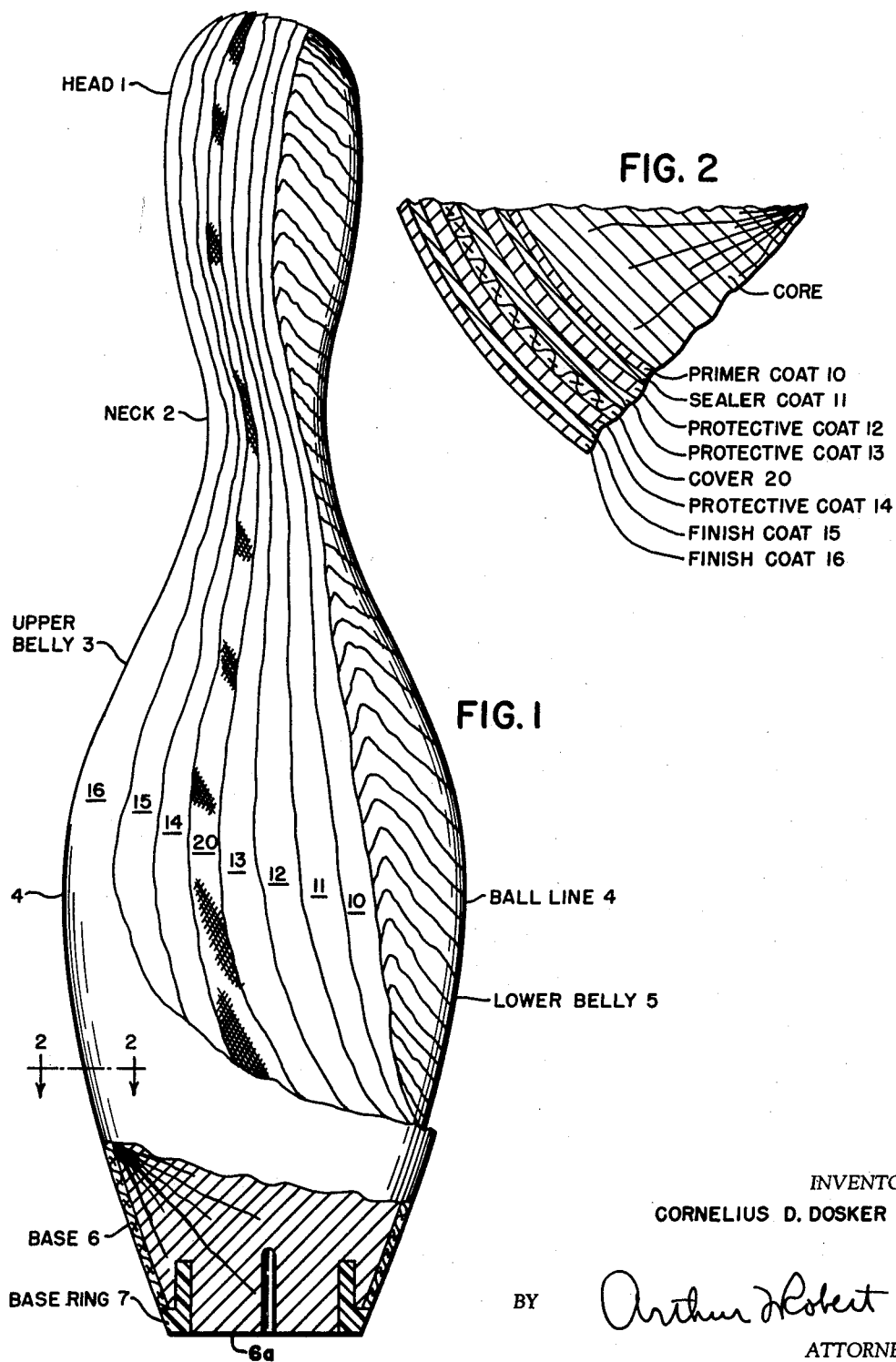

United States Patent Office 3,142,600
Patented July 28, 1964

3,142,600
METHOD OF MAKING A PLASTIC-COATED BOWLING PIN
Cornelius D. Dosker, Louisville, Ky., assignor to Gamble Brothers, Inc., Louisville, Ky., a corporation of Kentucky
Filed Apr. 13, 1959, Ser. No. 805,791
2 Claims. (Cl. 156—213)

This invention relates to wooden bowling pins covered with reinforced plastic coatings.

It is recognized that most of the damage suffered by a bowling pin takes place at three critical zones or areas, viz.: the ball line where a ball normally strikes the pin; the neck which is relatively small in diameter and, as a result, is relatively weak; and the head where the pin is grasped by the claws of modern automatic pin setters. Since the core of a plastic coated pin is turned undersize, the strength of its neck is thus further reduced. At the ball line, the pins are normally dented or compressed, splintered or "chunked." In the neck zone, the pins tend to break or crack and, in some cases, become completely severed. In the head zone, most of the damage is caused by the mechanical action of the automatic pin setter claws engaging the pin's surface. It is important to protect all three of these zones since damage in any one of them affects the serviceability of the pin.

Heretofore, it has been proposed to provide this protection by covering the undersize wood core of a pin with a cylindrical open-ended sleeve of knitted fabric having a diameter falling between the neck and ball line diameters of the core, stretching the sleeve longitudinally to cause it to tighten on the pin core, and coating it with suitable plastic material to form a fabric-reinforced plastic film which extends over and bonds itself thereto.

One difficulty accompanying this practice is that the reinforced plastic coating covering the upper portions of the pin, including the head and neck zones, seems to be substantially deficient in durability, wear-resistance and strength than the coating covering other areas of the pin. While I do not know with certainty the exact reasons why this should be, I believe that it may be due to one or more of the following things, namely: (1) the upper portion of the sleeve is not tensioned or stressed sufficiently to add much tensile strength to the plastic coating; (2) the sleeve is not snugly seated throughout the entire upper portion, particularly in the neck area, resulting in a poor bond being formed between the sleeve and core surface; and (3) the mesh openings in the upper portion of the sleeve are too constricted for the plastic coating to penetrate the fabric properly during its application to the sleeve.

The principal object of this invention is to provide a superior method of reinforcing a plastic coated bowling pin which produces a bowling pin of substantially increased durability.

Broadly speaking, my invention resides in reinforcing the plastic coating of a bowling pin with a preshaped fabric cover of interlinked fibers which is preformed or fashioned to the shape of at least the head, neck and the upper half of the belly of the pin but made on a slightly smaller scale so that it will fit or seat on the upper portion of the pin in a snug uniformly stretched condition. This insures uniform tension, which provides uniform reinforcement, and uniform fiber distribution or porosity, which promotes uniform penetration of the plastic material, hence uniform bonding.

Another feature of my invention resides in making the preshaped fabric cover in the form of a "pull-over" cover having its upper end closed and its lower end open so that it may be mounted on the pin simply by pulling it downwardly over the head, neck and belly of the pin. When a "pull-over" cover is thus preshaped to fit or seat closely upon the head, neck and the upper half of the belly of the pin, the lower portion of the cover may be either preformed to the shape of the lower half of the belly of the pin or made in the form of a depending cylinder having a diameter of ball line proportion.

In the latter event, when the cover is pulled or stretched downwardly, its depending cylinder will contract to fit snugly against the lower half of the belly and thereby provide on that portion uniform tension and uniform fiber distribution or porosity. Finally, the entire preshaped cover may be anchored in its snugly seated uniformly tensed condition in any suitable way. This is most simply done by clamping the lower end of the cover to the lower end of the pin by means of an elastic band.

The invention is illustrated in the drawings wherein:

FIG. 1 is a partly broken elevational view of a finished bowling pin constructed in accordance with this invention;

FIG. 2 is an enlarged fragmentary sectional view taken along line 2—2 of FIG. 1;

FIG. 3 is a smaller elevational view of the pin core before it is covered with the preshaped cover and plastic coatings;

FIG. 4 is an elevational view of the preshaped pull-over cover in a relaxed or non-stretched condition;

FIG. 5 is a perspective view of a relaxed elastic anchoring band for the cover;

FIG. 6 is an elevational view of the core with the cover stretched over it and anchored by the elastic band; and FIG. 7 is an enlarged fragmentary sectional view taken along line 7—7 of FIG. 6.

The finished bowling pin shown in FIG. 1 conventionally comprises: a solid wood core; and a fabric reinforced plastic coating.

The wood core is conventionally composed of solid or laminated maple wood. It conventionally includes: a head 1, neck 2, upper belly 3, ball line 4, lower belly 5, and base 6 having a plastic base ring 7 fixed in an annular slot at the periphery of the bottom surface of the base. The starting wood core, shown in FIG. 3, additionally includes an anchoring groove 8 in the periphery of the base 6 of the pin. This wood core should be smaller than a regulation wooden tenpin by an amount corresponding to the thickness of its fabric reinforced coating.

The fabric reinforced plastic coating may be formed by performing the following steps viz.: (1) condition the wood surface of the pin by applying and drying (a) a first or primer coat 10 to improve adhesion between the wood surface and subsequent coats and (b) a second or sealer coat 11 to seal the surface; (2) form the fabric reinforced plastic coating by (a) applying and partially drying third and fourth coats 12, 13 composed of tough plastic material to form a protective wear-resisting film, (b) applying the fabric cover while the fourth coat 13 remains slightly wet, and (c) applying and drying or hardening a fifth coat 14 composed of said protective plastic material while the fourth coat remains slightly wet; and (3) finish the surface of the pin by applying and drying sixth and seventh coats 15, 16 of finishing material.

Each of these coats may be readily applied by conventional methods such as dipping, spraying, flow-coating, roller-coating, etc. except that the protective coats normally are too heavy or viscous to be sprayed. The primer coat 10 may comprise a nitrocellulose elastomer solution. The sealer coat 11 may be a nitrocellulose sealer. In sealing the surface, it prevents any gas, which may be within the pin, from escaping and forming bubbles under the coatings or otherwise impairing the adhesion of the plastic cover to the wood core.

The protective coats 12, 13 and 14 may be composed of a suitable plastic material such as a gel lacquer, suitable examples of which are ethyl cellulose and cellulose acetate butyrate. Usually they contain a coloring pigment. They are partially dried, to a slightly wet condition wherein they contain from 5 to 10% of their original solvent content, before the next protective coat application but are completely dried before any finish coat is applied.

The finish coats 15, 16 are usually composed of a clear lacquer such as a nitrocellulose lacquer. Each finish coat is allowed to dry and usually the surface of the pin is printed or otherwise decorated between finish coats.

In accordance with my invention the fabric cover 20, which is applied over the fourth coat 13 is preformed or fashioned to the shape of at least the head 1, neck 2 and upper half 3 of the belly of the pin but made on a somewhat smaller scale so that it will fit or seat the upper portion of the pin above the ball line 4 in a snug and uniformly stretched condition. Accordingly, as indicated in FIG. 4, the preshaped fabric cover 20 has a head 21, neck 22, upper belly 23 and ball line 24. The preshaped fabric cover 20 is closed at its head end. In a relaxed condition, its head, neck and upper belly portions (21–24) are substantially smaller longitudinally than the corresponding upper portions of the pin. This can be seen by comparing the relaxed cover shown in FIG. 4 with the wooden core shown in FIG. 3 and noting that parts 21–24 of the cover stand at a higher elevation than the corresponding portions of the core. Diametrically they may range from slightly larger to slightly smaller so long as they grip the pin snugly when stretched or pulled longitudinally over it. The magnitude of these differences in size will, of course, depend upon the amount of stretch or tensional stress desired in the cover when mounted on the pin.

The preshaped cover 20 integrally extends substantially below that portion of the cover which is designated as the ball line 24 and which corresponds to the ball line 4 of the pin. This extension comprises a lower belly portion 25 and an excess portion 26. The lower belly portion 25 may, if desired, be preformed or fashioned to the shape of lower belly 5 of the pin and made on a slightly smaller scale so that it will fit or seat on the lower portion of the pin below the ball line 4 in a snug and uniformly stretched condition. Preferably, the extension of the preshaped fabric cover 20 is made in the form of a depending cylinder having a diameter the same as the diameter of the ball line 24 of the cover which is smaller than the diameter of the ball line 4 of the pin. With this arrangement, when the cover 20 is mounted on a pin and stretched downwardly, the lower belly portion 25 of the depending cylinder will contract inwardly to fit snugly against the lower belly 5 of the pin.

Preferably, the fabric cover 20 is in the form of a knitted fabric composed of a fiber having a high tensile strength such as nylon, rayon or fiber glass. However, it may be composed of woven fiber. Since flexibility and yieldability are desirable, a knitted construction, which will contract transversely when stretched longitudinally, is much to be preferred. A satisfactory cover may be knitted of threads composed of three 140 denier nylon filaments.

The cover 20 may be mounted on the pin in any suitable manner. This may be most simply accomplished by (a) preparing the cover for the mounting operation by rolling the lower end of its fabric walls outwardly and upwardly upon themselves until the entire cover is rolled into the form of a ring, which is open on the top side and closed on the bottom side by the head 21 of the cover, and then (b) placing the closed bottom side of this ring on the head 1 and unrolling the cover downwardly over the pin.

After the cover is completely unrolled, its lower end is grasped and pulled downwardly to stretch the cover downwardly over the pin with a (50 to 100 lbs.) force sufficient to tension the cover uniformly throughout its extent and cause its head, neck, upper belly and ball line portions to coincide with and fit snugly against the corresponding portions of the core and to contract its lower belly portion 25 into snug fitting and tensioned engagement with the lower belly portion 5 of the pin.

The cover 20, which should now be in snug or tight fitting engagement with the pin from its head 1 downwardly through its base 6 and which should also be under fairly uniform tension from the head 1 downwardly to the base 6, must now be maintained in that condition at least until the next or outer plastic coat 14 is applied and hardened. To do this, the lower end 26 of the cover should be anchored to the base 6. This may be very simply and effectively accomplished by expanding the relaxed rubber band 30, shown in FIG. 5, placing it over the base 6 and allowing it to contract into the anchoring groove 8 of the base 6 and thereby clamp the groove-surrounding portion of the cover 20 rigidly to the pin.

With the cover now properly clamped and thereby anchored, the remaining coats 14 through 16 may be applied. When the last protective coat 14 is applied, it penetrates the mesh openings of the cover thoroughly and bonds with the inner film, formed by the inner protective coats 12 and 13. As will be obvious, the cover 20 is wholly embedded in this relatively thick tough protective plastic coating so that the surface of the pin has a relatively smooth appearance.

At any desired time after the tough fabric reinforced plastic film, formed by the protective coatings 12–14, has hardened but before the final finish coat 16 is applied, the base 6 may be annularly cut to receive the base ring 7 while the base surface 6a should, if necessary, be machined to a smooth level condition.

It will be appreciated that I have provided a fabric reinforcement in the form of an elastic fabric cover having relaxed head, neck and upper belly portions preformed to approximate the shape of the head, neck and upper belly portions of a bowling pin of predetermined size and also to approximate the diametric sizes of such portions of the bowling pin. This cover, however, is made on a smaller longitudinal scale of predetermined proportions. Its elasticity is such as to render it longitudinally stretchable to conform lengthwise to the predetermined length of said portions of the bowling pin. Again when it is stretched longitudinally, it will vary diametrically to conform to the various diameters of that bowling pin.

While the lower belly portion of the cover may be preformed to approximate the shape and diametric sizes of the lower belly portion of said pin, it preferably is in the form of a uniform cylinder which is integral with the upper belly portion so that it depends therefrom. However, the elasticity of this cylinder renders it longitudinally stretchable and diametrically variable to conform to the predetermined size of the lower portion of the bowling pin.

Having described my invention, I claim:

1. A method of making a plastic coated pin comprising: providing a wood bowling pin having head, neck and belly portions of predetermined size and shape; providing an elongate porous elastic tubular fabric cover composed of interlinked fibers and fashioned with head, neck and upper and lower belly portions with the head, neck and upper belly portions, preformed so that, when they are relaxed, they approximate the shape and diametric sizes of the head, neck and upper belly portions of said bowling pin, said cover being made on a smaller longitudinal scale of such predetermined proportion that its elasticity renders its aforesaid portions longitudinally stretchable and diametrically variable into conformance with the position and size of the corresponding portions of said pin; mounting said cover over said pin; stretching said cover longitudinally to cause its head, neck, upper and lower belly portions to engage the corresponding portions of said pin snugly; anchoring said cover in longitudinally stretched condition on said pin; and applying a liquid plastic coating to said cover.

2. A method of making a plastic coated pin comprising:
A. providing a wood bowling pin having head, neck and belly portions of predetermined size and shape;
B. providing an elongate porous elastic tubular fabric cover composed of interlinked fibers and fashioned with neck and upper and lower belly portions with the neck and upper belly portions preformed so that, when they are relaxed, they respectively approximate the shape and diametric sizes of the neck and upper belly portions of said bowling pin, said cover being made on a smaller longitudinal scale of such predetermined proportion that its elasticity renders its aforesaid neck and belly portions longitudinally stretchable and diametrically variable into conformance with the position and size of the corresponding portions of said pin;
C. mounting said cover over said pin;
D. stretching said cover longitudinally to cause its neck, upper and lower belly portions to engage the corresponding portions of said pin snugly;
E. anchoring said cover in longitudinally stretched condition on said pin; and
F. applying a liquid plastic coating to said cover.

References Cited in the file of this patent

UNITED STATES PATENTS

| | | |
|---|---|---|
| 675,509 | Waters | June 4, 1901 |
| 1,507,711 | Pollock et al. | Sept. 9, 1924 |
| 1,701,856 | Kraeuter | Feb. 12, 1929 |
| 1,749,776 | O'lena | Mar. 11, 1930 |
| 1,986,256 | Ellis | Jan. 1, 1935 |
| 2,124,854 | Guinzburg | July 26, 1938 |
| 2,175,128 | Reach | Oct. 3, 1939 |
| 2,199,310 | Hartley | Apr. 30, 1940 |
| 2,201,706 | Sukohl | May 21, 1940 |
| 2,304,585 | McMinn | Dec. 8, 1942 |
| 2,535,033 | Bergere | Dec. 26, 1950 |
| 2,610,057 | Hunt | Sept. 9, 1952 |
| 2,636,836 | Whigham et al. | Apr. 28, 1953 |
| 2,656,294 | Hunt | Oct. 20, 1953 |
| 2,743,465 | Vogel | May 1, 1956 |

FOREIGN PATENTS

| | | |
|---|---|---|
| 22,332 | Great Britain | 1904 |